United States Patent
Berdahl (10) Patent No.: US 8,936,282 B1
(45) Date of Patent: Jan. 20, 2015

(54) STOP KNOT TYING DEVICE

(71) Applicant: Brian R. Berdahl, Red Lake Falls, MN (US)

(72) Inventor: Brian R. Berdahl, Red Lake Falls, MN (US)

( * ) Notice: Subject to any disclaimer, the term of this patent is extended or adjusted under 35 U.S.C. 154(b) by 0 days.

(21) Appl. No.: 13/777,800

(22) Filed: Feb. 26, 2013

Related U.S. Application Data (60) Provisional application No. 61/634,438, filed on Mar. 1, 2012.

(51) Int. Cl.
    *B65H 69/04* (2006.01)

(52) U.S. Cl.
    CPC ..................................... *B65H 69/04* (2013.01)
    USPC ........................................................... 289/17

(58) Field of Classification Search
    USPC ............................................................ 289/17
    See application file for complete search history.

(56) References Cited

U.S. PATENT DOCUMENTS

| | | | | |
|---|---|---|---|---|
| 3,106,417 A * | 10/1963 | Clow | ................................ | 289/17 |
| 3,712,651 A | 1/1973 | Shockley | | |
| 3,837,691 A * | 9/1974 | Smythe | ............................ | 289/17 |
| 4,403,797 A | 9/1983 | Ragland, Jr. | | |
| 4,572,554 A | 2/1986 | Janssen | | |
| 4,870,772 A * | 10/1989 | Johns | ................................ | 289/17 |
| 5,076,510 A * | 12/1991 | Norlander | ................... | 242/422.4 |
| 5,098,137 A | 3/1992 | Wardall | | |
| 5,104,160 A * | 4/1992 | Cheng | ............................... | 289/17 |
| 5,236,232 A * | 8/1993 | Broberg | ......................... | 289/1.5 |
| 5,450,866 A * | 9/1995 | Wang et al. | .................... | 132/325 |
| 5,536,051 A | 7/1996 | Morin | | |
| 5,647,616 A * | 7/1997 | Hamilton | ......................... | 289/17 |
| 5,799,438 A * | 9/1998 | Rodgers | ............................ | 47/46 |
| 6,179,240 B1 * | 1/2001 | Todd | .............................. | 242/442 |
| 6,234,420 B1 * | 5/2001 | Vetne et al. | ................. | 242/588.2 |
| 6,273,479 B1 * | 8/2001 | Carlson | ............................ | 289/17 |
| 6,322,112 B1 * | 11/2001 | Duncan | .......................... | 289/1.5 |
| 6,474,584 B2 * | 11/2002 | Ekich | ............................ | 242/371 |
| 6,527,217 B1 * | 3/2003 | Lyons | ......................... | 242/423.2 |
| 6,547,177 B2 * | 4/2003 | Fitzpatrick | ................. | 242/439.1 |
| 6,578,787 B2 * | 6/2003 | Yonenoi | ..................... | 242/419.4 |
| 6,634,680 B1 | 10/2003 | Firestone | | |
| 6,648,378 B1 * | 11/2003 | Torres et al. | .................... | 289/1.5 |
| 6,715,804 B2 | 4/2004 | Beers | | |
| 7,967,344 B2 * | 6/2011 | Herren | ............................ | 289/17 |
| 7,997,629 B2 * | 8/2011 | High | ............................... | 289/17 |
| 2010/0038906 A1 * | 2/2010 | Herren | ............................ | 289/17 |

* cited by examiner

*Primary Examiner* — Shaun R Hurley
(74) *Attorney, Agent, or Firm* — Neustel Law Offices (57) ABSTRACT

A stop knot tying device which aids with tying a stop knot directly on a fishing line for use with a slip bobber. The stop knot tying device generally includes a main body having a retainer portion and an elongated portion extending therefrom. The retainer portion includes a ring member and funnel member which act to retain a coil of string. A distal, free end of the coil of string exits the retainer portion through an aperture on its ring member. The elongated portion includes a slot running along its length and at least one notch. By positioning a fishing line within the slot through one of the notches and winding a cut-away portion of string around the line, one can utilize the present invention to efficiently and safely tie a stop knot on a fishing line.

11 Claims, 7 Drawing Sheets

STOP KNOT TYING DEVICE

CROSS REFERENCE TO RELATED APPLICATIONS

I hereby claim benefit under Title 35, United States Code, Section 119(e) of U.S. provisional patent application Ser. No. 61/634,438 filed Mar. 1, 2012. The 61/634,438 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a knot tying device and more specifically it relates to a stop knot tying device which aids with tying a stop knot bobber stop directly on a fishing line at any chosen location without the removal of any tackle to aide as a slip bobber stop knot.

2. Description of the Related Art

Any discussion of the related art throughout the specification should in no way be considered as an admission that such related art is widely known or forms part of common general knowledge in the field.

Slip bobber fishing has become increasingly popular over the last few years due to its success in fishing for various species of fish, such as crappie, perch and all other varieties of fish. A slip bobber allows for far more maneuverability while fishing and eases with casting while a line is rigged up with a hook, bait, lure and slip bobber.

When using a slip bobber, it is highly preferable that a stop knot be utilized to prevent the slip bobber from sliding for the entire length of the fishing line. The stop knot is generally positioned above the slip bobber, with the slip bobber being positioned between the stop knot and the hook to act as a desired stopping point for the slip bobber when coming in contact with the stop knot.

Tying a stop knot can be a frustrating and time-consuming task for one without experience tying hundreds or even thousands of such knots. Further, even experienced veterans can have difficulty efficiently tying stop knots due to the translucency and small diameter of fishing line and the frequent encounters with wet conditions when fishing.

Because of the inherent problems with the related art, there is a need for a new and improved stop knot tying device which aids with tying a stop knot bobber stop directly on a fishing line at any chosen location without the removal of any tackle to aide as a slip bobber stop knot.

BRIEF SUMMARY OF THE INVENTION

The invention generally relates to a knot tying device which includes a main body having a retainer portion and an elongated portion extending therefrom. The retainer portion includes a ring member and funnel member which act to retain a coil of string. A distal, free end of the coil of string exits the retainer portion through an aperture on its ring member. The elongated portion includes a slot running along its length and at least one notch. By positioning a fishing line within the slot through one of the notches and winding a cut-away portion of string around the line, one can utilize the present invention to efficiently and safely tie a stop knot directly to a fishing line at a chosen location without the removal of any fishing tackle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate a stop knot tying device 10, which comprises a main body 20 having a retainer portion 30 and an elongated portion 40 extending therefrom. The retainer portion 30 includes a ring member 31 and funnel member 34 which act to retain a coil of string 12. A distal, free end of the coil of string 12 exits the retainer portion 30 through an aperture 33 on its ring member 31. The elongated portion 40 includes a slot 45 running along its length and at least one notch 46, 47. By positioning a fishing line 14 within the slot 45 through one of the notches 46, 47 and winding a cut-away portion of string 12 around the line 14, one can utilize the present invention to efficiently and safely tie a stop knot on a fishing line 14.

B. Main Body

As shown throughout the figures, the present invention generally comprises a main body 20 having a first end 22 and a second end 24. The overall configuration and size of the main body 20 may vary for different embodiments of the present invention. Thus, the configuration, orientation and size of the main body 20 should not be construed as being limited by the exemplary figures hereto.

Figure 1:
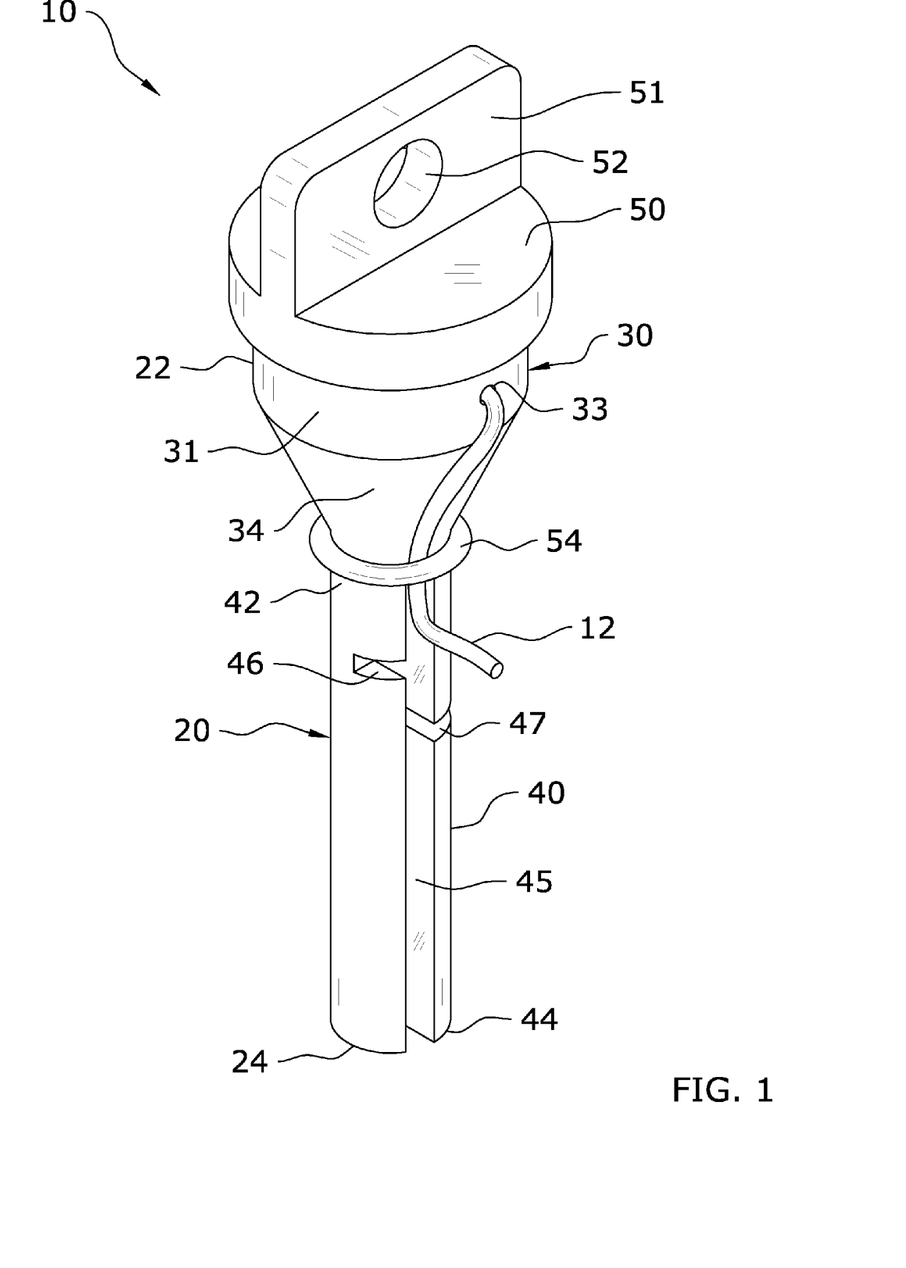
FIG. 1 is an upper perspective view of the present invention.

The main body 20 of the present invention is generally comprised of a retainer portion 30 at its first end 22 and an elongated portion 40 extending from the retainer portion 30. The elongated portion 40 comprises the second end 24 of the main body 20 as shown in FIG. 1.

The retainer portion 30 and elongated portion 40 may be integrally formed of a unitary structure or, in alternate embodiments, may be comprised of discrete structures either fixedly or removably secured to each other. The retainer portion 30 and elongated portion 40 may be comprised of the same material or of different materials with respect to each other.

i. Retainer Portion.

The retainer portion 30 of the present invention stores quantity of string 12 to be used in trying the stop knot on the fishing line 14. The retainer portion 30 is generally positioned at the first end 22 of the main body 20 as shown in the figures. The retainer portion 30 may be comprised of various structure which allow a length of string 12 to be stored and dispensed therefrom.

Figure 2:
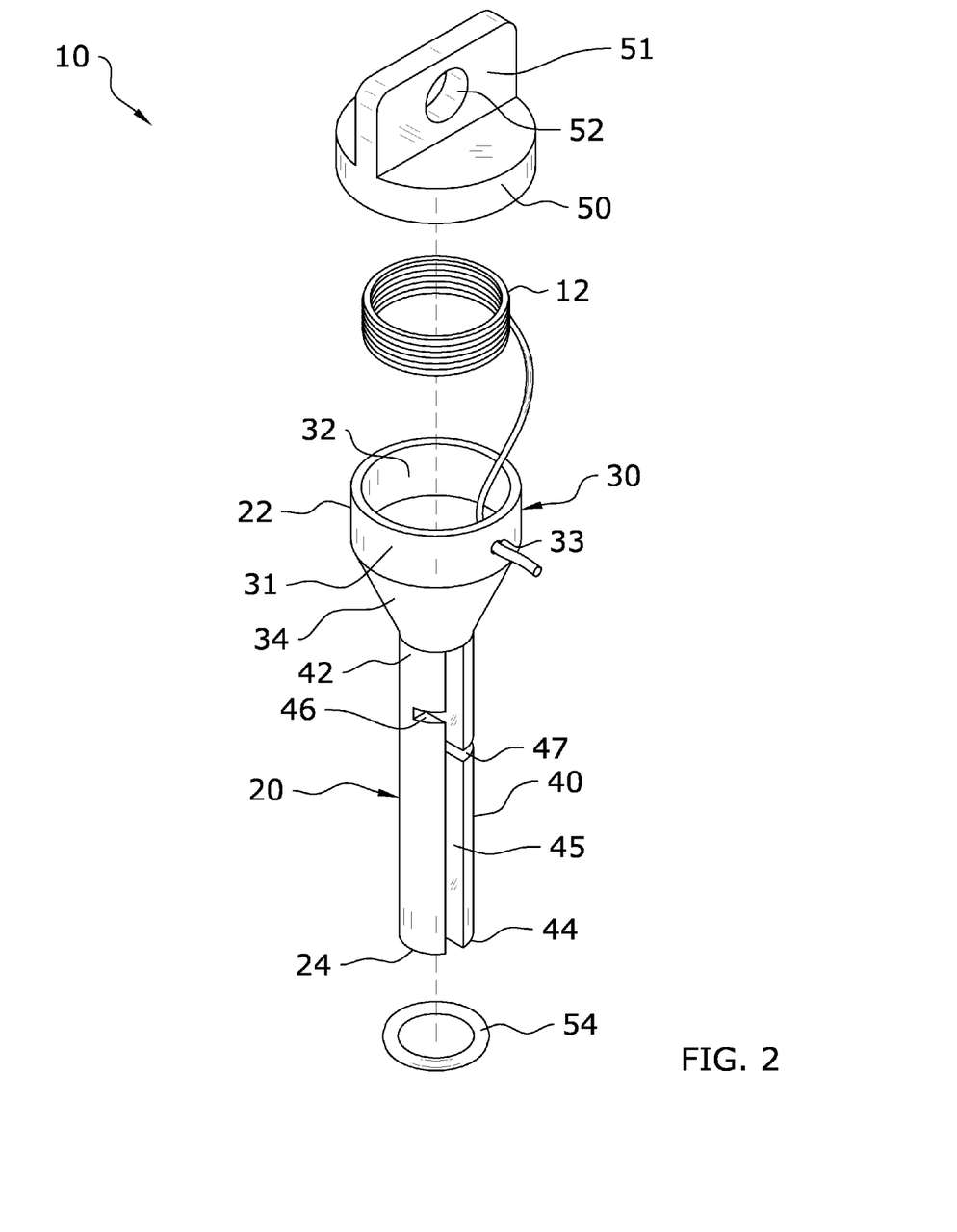
FIG. 2 is an exploded upper perspective view of the present invention's various parts.
Figure 3:
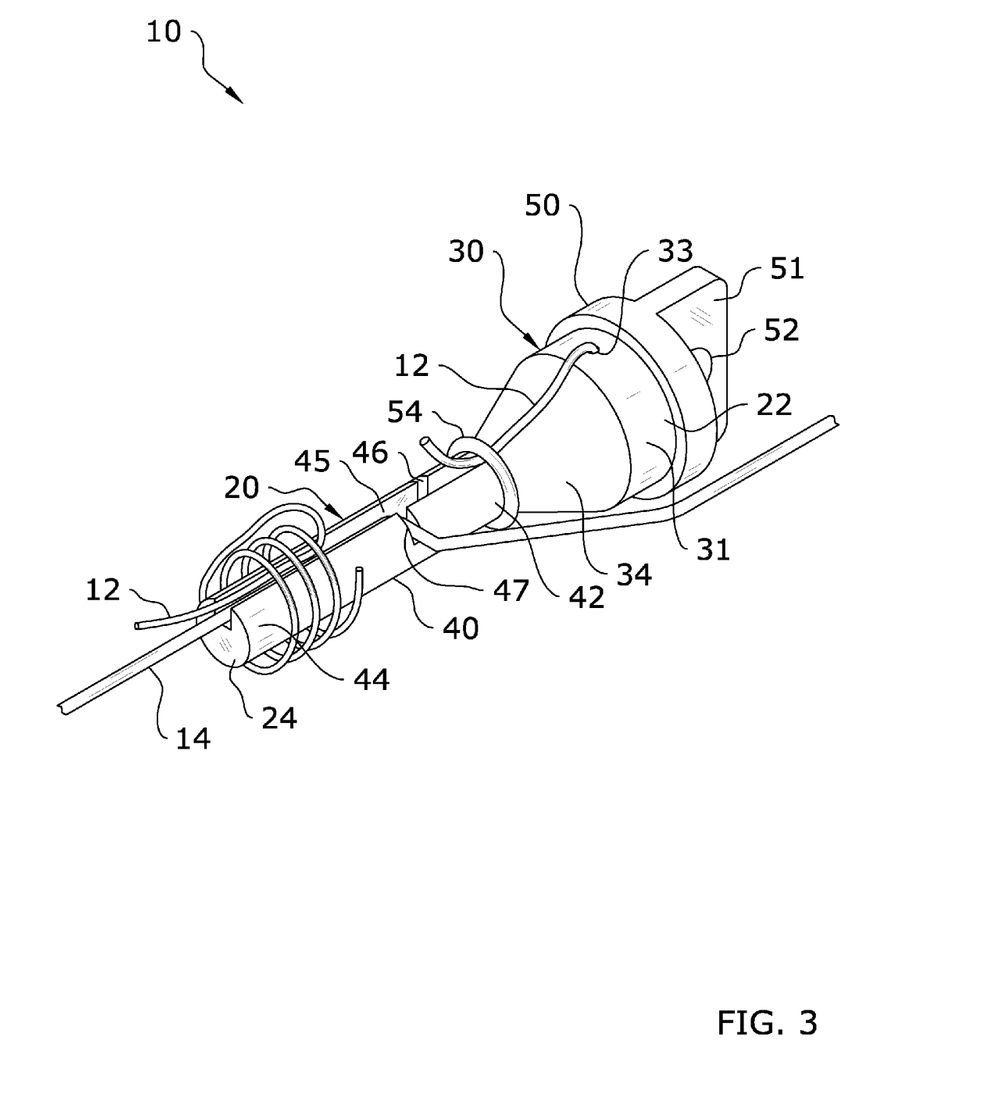
FIG. 3 is an upper side perspective view of the present invention mid-use.

In a preferred embodiment as shown in FIG. 2, the retainer portion 30 comprises a ring member 31 and a funnel member 34 extending from the ring member 31. The ring member 31 is comprised of a ring which forms the upper opening 32 of both the retainer portion 30 and the main body 20 as a whole. An aperture 33 extends through the outer circumference of the ring member 31 of the retainer portion 30 through which the string 12 will be dispensed, such as shown in FIG. 3. The funnel member 34 extends directly from the ring member 31 and aids in defining a cavity in which the string 12 is stored.

The ring member 31 and funnel member 34 may in most embodiments be comprised of an integrated, unitary structure. However, it is appreciated that the ring member 31 and funnel member 34 may in some embodiments be comprised of discrete structures wither fixedly or removably secured to each other.

A spool of string 12 is generally positioned within the retainer portion 30, with a distal end of the string 12 being extended through the aperture 33 of the ring member 31. As this string 12 will in most cases remain extending through this aperture 33, the present invention may include a string holder 54 as shown in FIGS. 2 and 3.

The string holder 54 retains the free end of the string 12 against the main body 20 of the present invention such that the string 12 is not inadvertently extracted or allowed to freely flop around. The string holder 54 may be comprised of various embodiments, but will preferably be comprised of a loop which is positioned around the elongated portion 40 to retain the free end of the string 12 thereagainst.

ii. Elongated Portion.

As shown throughout the figures, the main body 20 includes an elongated portion 40 which extends from the retainer portion 30. The elongated portion 20 comprises the second end 24 of the main body 20 and is utilized as a point around which to wrap the string 12 when forming a stop knot on fishing line 14.

The elongated portion 40 is generally comprised of an elongated cylinder or similar shape extending from the funnel member 34 of the retainer portion 30. While the figures illustrate the elongated portion 40 having a circular cross-section, it is appreciated that various other configurations may be utilized. Thus, the cylindrical nature and circular cross-section shown in the figures should be considered exemplary and non-limiting on the scope of this disclosure.

The elongated portion 40 includes a first end 42 and a second end 44. The first end 42 of the elongated portion 40 terminates with the funnel member 34 of the retainer portion 30. The first end 42 of the elongated portion 40 may be integrally formed with the funnel member 34 or in other embodiments may be fixedly or removably attached thereto. The second end 44 of the elongated portion 40 forms the second end 24 of the main body 20 as shown in FIG. 1.

The elongated portion 40 includes a slot 45 extending from its first end 42 to its second end 44. The slot 45 may be positioned anywhere along the outer circumference of the elongated portion 40 so long as it runs its length. The slot 45 is utilized to retain the fishing line 14 as the string 12 is wound therearound.

A pair of notches 46, 47 are positioned on either side of the slot 45 of the elongated portion 40 in a staggered arrangement as shown in FIG. 2. Thus, a first notch 46 extends into a first side of the slot 45 at a first position and a second notch 47 extends into a second side of the slot 45 at a second position. The notches 46, 47 are utilized to retain and wind the fishing line 14 through the slot 45 when the present invention is in use.

iii. Cap.

The present invention includes a cap 50 which encloses the upper opening 32 of the retainer portion 30 to retain a winding of string 12 therein. The cap 50 may be comprised of various configurations, but will generally include a tab 51 to aid in installing and removing the cap 50 to/from the retainer portion 30. An opening 52 extends through the tab 51 through which a lanyard or other device may be inserted to aid with hanging the present invention from the neck of a user.

C. Operation of Preferred Embodiment

In use, a length of string 12 is first pulled from the retainer portion 30 through the aperture 33 on the ring member 31 of the retainer portion 30. The desired amount of string 12 is cut away, such as by scissors or an integrated nail clipper, and the remaining distal end of the wind of string 12 is secured against the retainer portion 30 using the string holder 54 where it will remain for future use. In some embodiments, the cutting tool such as a nail clipper may be attached directly to the present invention, such as by a cord.

Figure 4:
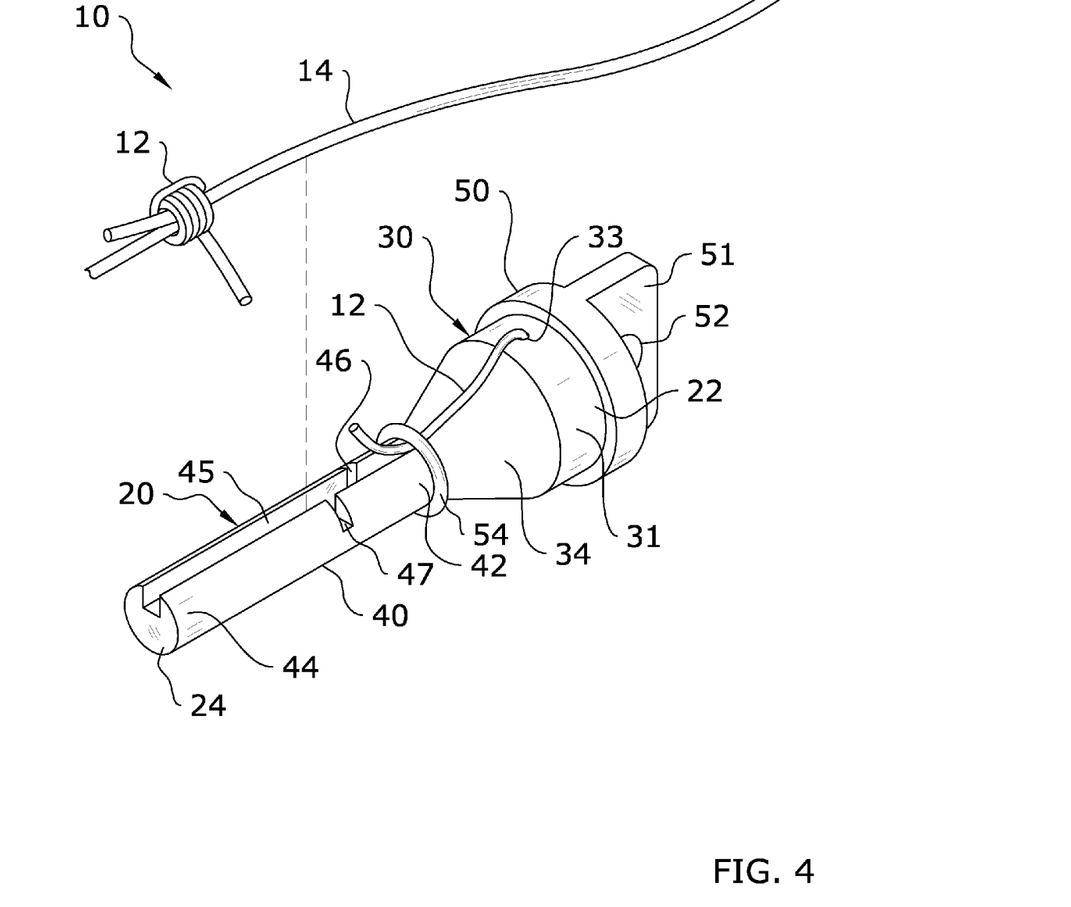
FIG. 4 is an upper side perspective view of a stop knot tied onto a fishing line after use of the present invention.
Figure 5:
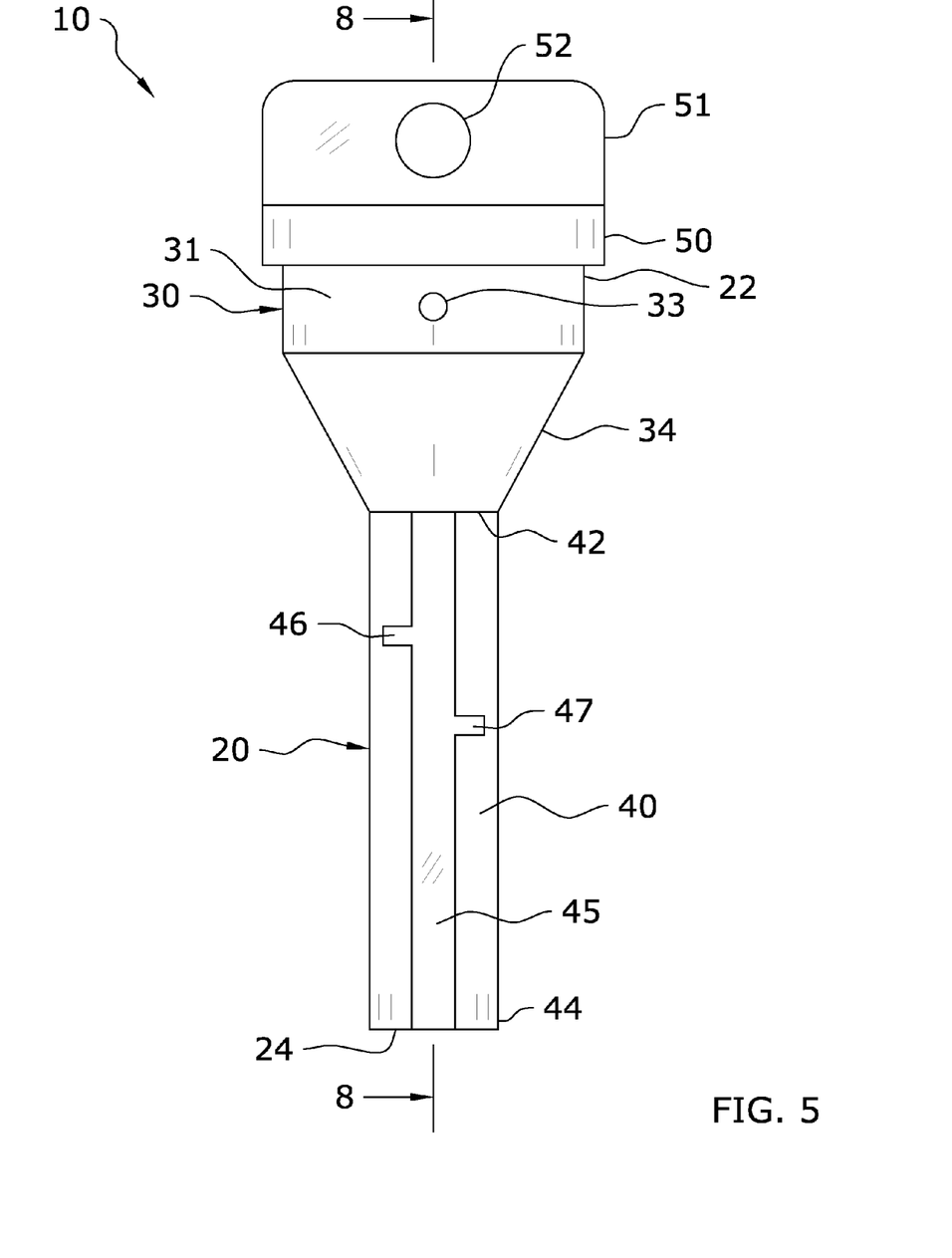
FIG. 5 is a frontal view of the present invention.
Figure 6:
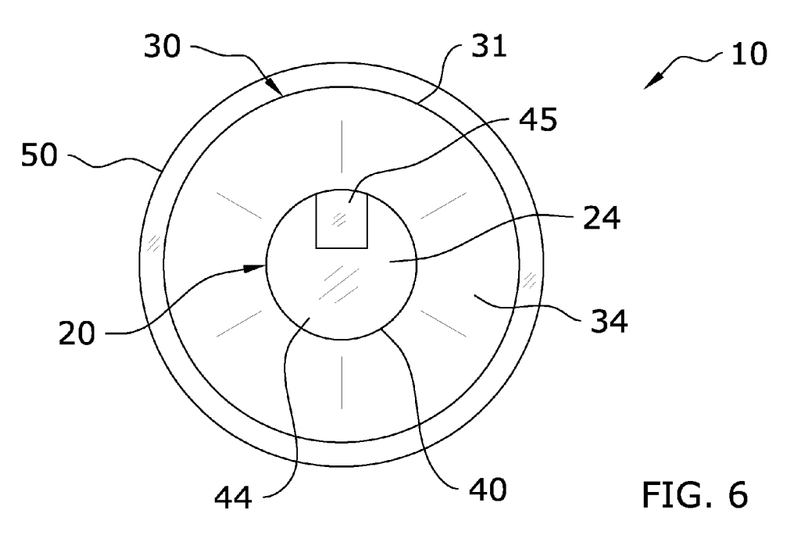
FIG. 6 is a bottom view of the present invention.
Figure 7:
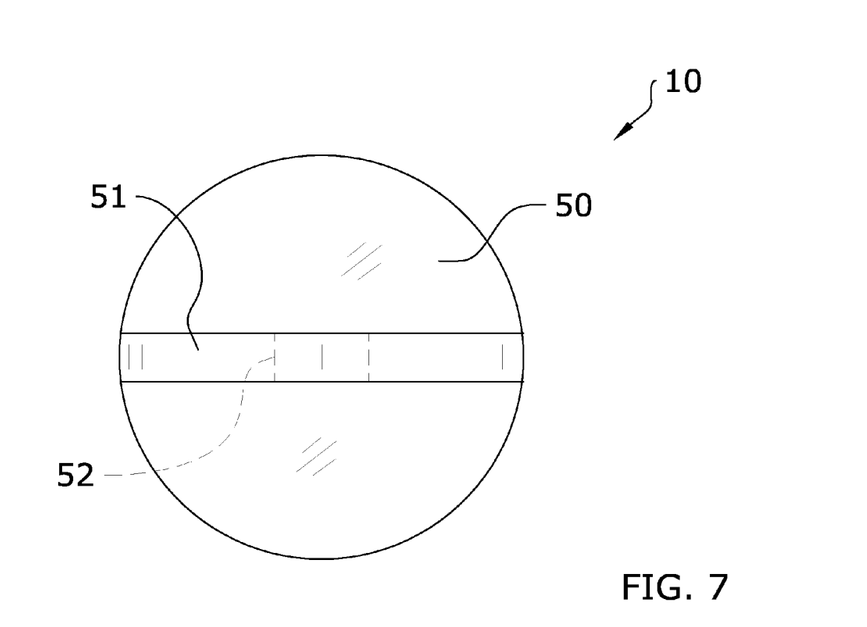
FIG. 7 is a top view of the present invention.
Figure 8:
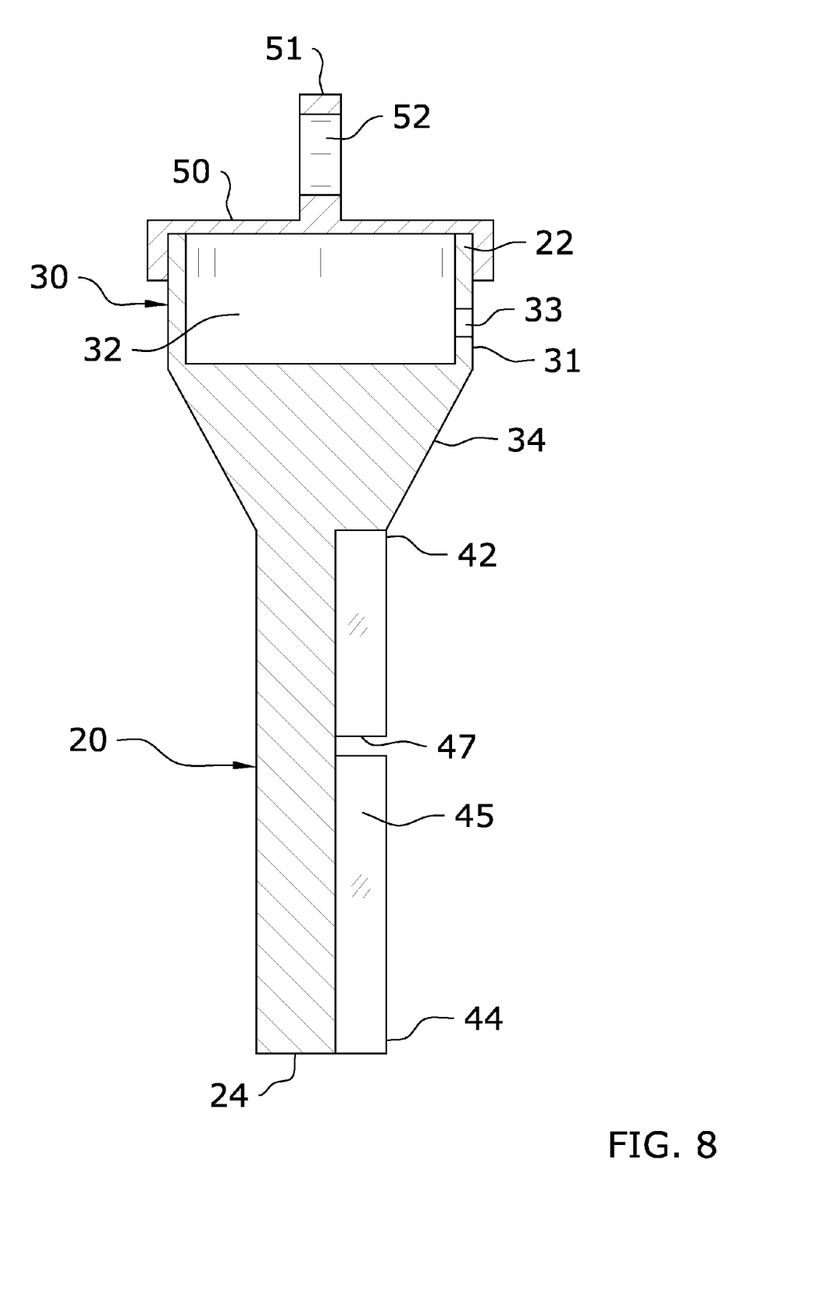
FIG. 8 is a side sectional view of the present invention taken along line 8-8 of FIG. 5.

The cut-away length of string 12 is retainer for use in tying the stop knot. A length of fishing line 14 is secured within the slot 45 of the elongated portion 40 by first positioning a portion of the line 14 through one of the notches 46, 47 and allowing a length of the line 14 to rest within the slot 45 as shown in FIG. 3. The string 12 is then wound around the elongated portion 40 (and thus the retained line 14) a number of times before a free end of the string 12 is passed back through the coils as also shown in FIG. 3. The string 12 is pulled tight to create the stop knot and the present invention pulled away as shown in FIG. 4.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A stop knot tying device, comprising:
   a retainer portion for storing a coil of string, wherein said retainer portion is comprised of a ring member and a funnel member extending from said ring member, wherein said ring member includes an aperture through which a free end of said coil of string may be extended;
   an elongated portion extending from said retainer portion, said elongated portion including a slot for retaining a portion of a fishing line; and
   a cap for securing to said retainer portion.

2. The stop knot tying device of claim 1, wherein said ring member and said funnel member are integrally formed of a unitary structure.

3. The stop knot tying device of claim 1, wherein said retainer portion and said elongated portion are integrally formed of a unitary structure.

4. The stop knot tying device of claim 1, further comprising a first notch positioned adjacent a first side of said slot.

5. The stop knot tying device of claim 1, further comprising a second notch positioned adjacent a second side of said slot.

6. The stop knot tying device of claim 1, wherein said cap includes a tab.

7. The stop knot tying device of claim 6, wherein said tab includes an opening extending therethrough.

8. The stop knot tying device of claim 1, wherein said retainer portion includes a cavity for storing said coil of string.

9. The stop knot tying device of claim 1, further comprising a string holder for retaining said free end of said coil of string against said elongated portion.

10. A method of tying a stop knot, comprising:
    providing a stop knot tying device, said stop knot tying device being comprised of a retainer portion and an elongated portion, said retainer portion storing a coil of string and said elongated portion including a slot extending along its length;
    extracting a length of string from said retainer portion through an aperture formed within said retainer portion;
    cutting said length of string;
    positioning a fishing line within said slot;
    wrapping said length of string around said elongated portion and said fishing line a plurality of times; and
    returning one end of said string through said wrapped string and pulling tight to form said stop knot.

11. The method of tying a stop knot of claim 10, wherein said retainer portion and said elongated portion are integrally formed of a unitary structure.

* * * * *